Patented Dec. 12, 1950

2,533,723

UNITED STATES PATENT OFFICE 2,533,723

CATALYTIC AMINE-KETONE CONDENSATION

Bernard A. Dombrow, New York, N. Y., assignor to Nopco Chemical Company, Harrison, N. J., a corporation of New Jersey No Drawing. Application July 28, 1947, Serial No. 764,253

9 Claims. (Cl. 260—566)

This invention relates to the reaction of a ketone with a primary amine in the presence of a surface active clay catalyst.

The condensation of ketones with certain primary amines to form Schiff's bases has long been known. However, with many materials, reactions of this type are quite slow. This is particularly true in the case of ketones of low boiling point because the reaction velocity at their reflux temperatures is too slow to be commercially feasible. Sluggish amine-ketone condensations are also encountered when the ketone has one or more branched chains and with ketones not having a methyl group attached to the carbonyl carbon atom.

When the method of the present invention is employed by introducing a surface active clay catalyst into the reaction field, the reaction proceeds to substantial completion in a fraction of the time formerly required for a frequently incomplete reaction. The catalysts are inexpensive and reduce the operation costs greatly since less heat is required for the process. Moreover, they catalyze the condensation of certain ketones with amines at temperatures sufficiently low to permit operating at atmospheric pressure thus rendering unnecessary the use of the pressure equipment formerly required in commercial operations.

The principal object of the invention is to provide an improved method for the condensation of ketones with primary amines in producing Schiff's bases and their secondary amine derivatives.

Other objects of the invention will in part be obvious and will in part appear hereinafter.

The present invention concerns condensing a ketone with a primary amine in the presence of a surface active clay catalyst to form the corresponding Schiff's base and in hydrogenating that base to the corresponding secondary amine.

The invention accordingly comprises the several steps and the relation of one or more of such steps with respect to each of the others thereof, which will be exemplified in the method hereinafter disclosed, and the scope of the invention will be indicated in the claims.

The reaction to which the present invention relates follows the course:

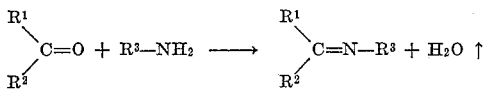

The product is a Schiff's base, this term being used herein in the broad sense to denote the condensation products derived from aliphatic amines as well as aromatic amines. Hydrogenation of this base produces a secondary amine of similar structure:

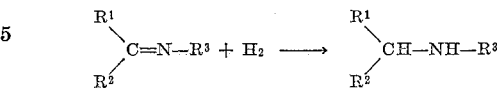

For the purposes of this invention, $R^1$, $R^2$ and $R^3$ each represents an aliphatic, araliphatic or aromatic group and the sum of the carbon atoms in $R^1$ and $R^2$ is equal to 4 or more. In the simpler aliphatic ketones having less than 5 carbon atoms in the molecule, the chief products would be those resulting from self condensation or polymerization of the ketones rather than the desired Schiff's base; therefore, the new catalytic method is directed at condensations involving the higher ketones. No upper limit for the total of carbon atoms in $R^1$ and $R^2$ is known, but there is less need for a catalyst to speed up the fairly rapid reaction rates of the higher ketones which have high boiling points. Thus while the catalysts described hereinbelow are operative in increasing the reaction velocities of all ketones with a primary amine, their greatest utility is in cases where the ketones contain from 5 to about 12 carbon atoms per molecule. It should also be borne in mind that the ketone starting material may be a symmetrical or a mixed ketone. Also, where a mixture of products is desirable, a mixture of various ketones, various primary amines, or both, can be employed. Specific examples of ketone reactants comprise, inter alia, methyl isopropyl ketone, methyl isobutyl ketone, diisobutyl ketone, methyl amyl ketone, methyl hexyl ketone, methyl heptyl ketone, acetophenone, methyl benzyl ketone, and so forth.

The only limitation on the nitrogen-containing reactant is that it must have at least one primary amino group for otherwise it cannot react to form the Schiff's base. Suitable primary amines include alkylolamines, polyamines, aniline, naphthylamine, monoethanolamine, monoisopropanolamine, aminoethyl ethanolamine, 4-amino butanol-2, diethylene triamine, triethylene tetramine, tetraethylene pentamine and dipropylene triamine, to mention only a few of the many operative compounds.

No attempt is made herein to list all of the specific examples of operative reactants and those set forth above were merely chosen as readily available raw materials which yield Schiff's bases and secondary amines of considerable interest as intermediates in chemical syntheses.

The proportions of the reactants are not critical, but it is desirable in general from the criteria of economy and ease of recovery of unused reactants to employ a considerable excess of the ketone, which is cheaper than the amine, ratios of approximately 4 moles of the ketone per mole of primary amine being preferred in most cases.

A wide variety of conditions are suitable in carrying out the condensation in the presence of one of the catalysts and very simple equipment may be employed. The catalyst is customarily introduced with the reactants and filtered out of the reaction products upon completion of the chemical change. For economy, operating at atmospheric pressure in a vessel equipped with a reflux condenser provided with a Dean water trap is preferred, although any pressure may be used so long as the temperature is maintained within the rather wide acceptable limits. Elevated temperatures are necessary in the attainment of a feasible reaction rate, and the general rule is that reflux temperatures under atmospheric pressure are adequate. Many of the reaction mixtures reflux at temperatures in the range from 150 to 200° C. with excellent results. The upper limit of reaction temperatures is the point at which any of the substances in the reaction mass decompose, while temperatures below about 100° C. usually slow the reaction down too much for commercial operations. Completion of this condensation reaction is most easily determined by the quantity of water accumulating in the water trap.

The catalysts of the present invention are the surface active clays. These are mineral agents of high specific surface or which contain substantial proportions of silicates. Among the naturally occurring clays of this type are bleaching earths, kaolins, fuller's earth, bentonite, infusorial earth and the like. The properties of these substances are considerably enhanced by treatment with an acid such as hydrochloric, phosphoric and like acids. These acid-activated materials consist chiefly of hydrosilicates of aluminum, magnesium and iron and free hydrated silicic acid. They are sold under a variety of trade-marks and trade-names and are preferred in the present process because their catalytic efficiency is greatly superior to that of the untreated clays. It is believed that the acid treatment increases the specific surface of the clay by leaching out certain constituents. The expression "surface active clays" is used herein to include both the untreated, naturally occurring materials and the acid-treated hydrosilicates. Both types of clay increase the reaction rate of primary amine-ketone condensations.

In terms of the weight of the amine reactant, excellent results are obtained with about 1 to 5% of the catalyst; however, other proportions are operative. Quantities below 1% will speed up the reaction to an appreciable but lesser extent. It is usually not advisable to employ the hydrosilicate catalyst in amounts greater than 10% of the weight of the primary amine, because this catalyst also has a tendency to promote side reactions, especially the self condensation of the ketone, particularly where there is a large excess of ketone in the reaction field.

The process of the present invention is well adapted for the preparation of the novel class of compounds partially disclosed herein and claimed in my copending application Serial No. 764,254, filed concurrently, now abandoned.

For a fuller understanding of the nature and objects of the invention, reference should be had to the following examples which illustrate the invention. All parts are given in terms of weight unless otherwise stated.

Example I

| | Grams |
|---|---|
| Methyl isobutyl ketone | 75.0 |
| Aniline | 46.5 |

The above ingredients were placed in a flask provided with a reflux condenser equipped with a water trap. Various degrees of heat were applied from gentle heating to refluxing, but only 1 ml. of water was collected in the trap during a period of 8 hours. This indicated that the condensation to the Schiff's base was only about 10% complete.

Example II

| | Grams |
|---|---|
| Methyl isobutyl ketone | 150 |
| Aniline | 50 |

The substances listed were refluxed for 11 hours in the apparatus of Example I with evolution of only 2.3 ml. of water. Thus, although the greater excess of ketone over Example I promoted the reaction somewhat, only 24% of the aniline reacted with the ketone.

Example III

| | Grams |
|---|---|
| Methyl isobutyl ketone | 100 |
| Aniline | 50 |
| Acid-treated hydrosilicate catalyst | 2 |

Upon refluxing the above materials for 3 hours in the same apparatus, 8.0 ml. of water condensed in the water trap, indicating that the reaction was 83% complete. The reaction mass was filtered to remove the activated clay catalyst; then the yellow filtrate was distilled under an absolute pressure of 10 mm. of mercury. The more volatile fraction containing unreacted ketone and a small amount of aniline was collected in one receiver, and 72 grams of the water-white Schiff's base boiling at 105.5° C. under the reduced pressure were collected in a separate vessel. The undistilled residue was negligible.

Example IV

| | Grams |
|---|---|
| Methyl amyl ketone | 75 |
| Aniline | 50 |

These reactants were refluxed for 4½ hours in the same apparatus as in the preceding examples. During this time 8.3 ml. of water (85% completion of reaction) were trapped off and the temperature reached a maximum of 203° C. Next the unreacted materials amounting to 23.5 grams were distilled off under reduced pressure. Upon further reducing the pressure to 14 mm. absolute, 79.5 grams of the Schiff's base of methyl amyl ketone and aniline were obtained as a pale yellow liquid boiling at approximately 135° C.

Example V

| | Grams |
|---|---|
| Methyl amyl ketone | 75 |
| Aniline | 50 |
| Acid-treated hydrosilicate catalyst | 2 |

The substances listed were refluxed as in the preceding example. 8.0 ml. of water were evolved during the first hour and an additional 1.0 ml. collected in the trap in the next half hour; this corresponded to 83% and 93% completion of the reaction, respectively. The clay catalyst was filtered off from the orange reaction products and the volatile matter distilled off at subatmospheric pressure; then 57 grams of the Schiff's base were obtained in the manner set forth above. While the catalyst greatly expedited the reaction, it also promoted reactions which produced 26 grams of matter boiling around 190° C./13 mm.

Example VI

| | Grams |
|---|---|
| Methyl amyl ketone | 125 |
| Aniline | 50 |
| Acid-treated hydrosilicate catalyst | 2 |

Upon condensing the above reactants in the same manner with a larger excess of ketone present in an effort to reduce the formation of high-boiling by-products, the water formed indicated the degree of completion of reaction to be 83% in 1 hour and 99% after an additional 35 minutes. Distillation was commenced and produced 66 grams of unreacted material, 67 grams of the light yellow Schiff's base boiling within the range 119–128° C./8 mm., 6 grams of a yellow oily compound with a boiling point of approximately 150° C./8 mm. and 12 grams of undistilled residue. It was observed that the greater proportion of ketone had favorably shifted the equilibrium and reduced the side reactions which produce higher boiling resultants. This suppression of side reactions is probably due to the lower reflux temperature of the more volatile mixture.

Example VII

| | Grams |
|---|---|
| Methyl isobutyl ketone | 100 |
| Diethylene triamine | 25 |
| Acid-treated hydrosilicate catalyst | 2 |

The ketone and polyamine were introduced into apparatus of the type used before and found to be immiscible at the beginning but gradually blended into a homogeneous mixture during the reaction. When it was discovered that the reaction was proceeding comparatively slowly at the end of 2 hours, the catalyst was added and substantially increased the velocity of the reaction. It was calculated from the formation of water that 88% of the polyamine starting material had condensed with the ketone during the total reaction time of 2½ hours. The activated clay was filtered off; and fractional distillation in vacuo of the light yellow filtrate yielded 46 grams of "heads" or forerun, 55 grams of the Schiff's base of pale yellow color and boiling range of 162–173° C./10 mm., and 3 grams of a red liquid residue.

From the stoichiometry of the reaction and characteristics of the product, it was realized that one molecule of the ketone had condensed with each of the two primary amino groupings in the polyamine molecule. A minor amount of the product of a single condensation, that is, one molecule of ketone condensing with one molecule of the polyamine, was also undoubtedly present. Reversing the ratio of reactants by using an excess of polyamine would produce a mixture consisting chiefly of the single condensation product.

Example VIII 63 parts by weight of the Schiff's base of Example III were hydrogenated in the presence of 5 parts of Rupert's nickel catalyst (a hardened fat carrier containing 23% by weight of activated, finely divided nickel) in a pressure vessel for 8 hours with hydrogen which was intermittently introduced under a pressure of 350 p. s. i. gage pressure. The reaction was found to commence at about 100° C., so the temperature was raised and maintained around 135° C. Thereafter the reaction products were filtered, thereby removing the nickel catalyst, acidified with dilute hydrochloric acid and steam distilled; an estimated 5 parts of ketone were obtained. After chilling the steam distilland, the fat carrier for the catalyst was filtered off and the filtrate made alkaline by adding caustic soda to decompose the organic hydrochloride salts. This alkaline mass was extracted with ether. Next the ether was evaporated off from the extract which was then distilled under a reduced pressure of 7 mm. in apparatus equipped with a Hempel column. 27 parts of the hydrogenated product, 2-anilino 4-methyl pentane (N-2-isohexyl aniline), distilled over at 111–112° C. Its index of refraction was found to be 1.5179 at 23° C. and chemical tests indicated the presence of a secondary amine radical. It was evident that the 9 parts of the fraction boiling at 89 to 106° C. and the 4.5 parts of light yellow liquid residue contained appreciable quantities of the desired product, but no effort was made to recover these portions of the hydrogenated product.

Example IX 47 parts of another sample of the Schiff's base of Example III were hydrogenated at room temperature for about 5 hours with hydrogen under an initial gage pressure of 42 p. s. i. in the presence of 2 parts of a catalyst consisting of about 10% of finely divided palladium on a zirconium oxide carrier. The product was separated in the same manner as in Example VIII and had an index of refraction of 1.5192 at 23° C.

Example X 21 parts by weight of the product of Example VI were hydrogenated at room temperature in a pressure vessel after mixing with 20 parts of isopropanol as a diluent and 1 part of the palladium catalyst mass of Example IX. Hydrogen was introduced into the vessel at 51 p. s. i. gage pressure, and this pressure had dropped to 36 p. s. i. at the end of about two hours. Then the reaction mass was withdrawn from the reaction vessel and centrifuged to recover the catalyst. Upon treatment with dilute HCl, the unchanged Schiff's base was hydrolyzed to the starting materials, ketone and aniline, while the hydrogenated product and aniline formed salts with the acid. Steam distillation was employed to remove the methyl amyl ketone. Next the residue in the distilling flask was made alkaline by adding caustic soda to decompose the hydrochloride salts, and the mass was extracted with ether. When the ether extract was distilled under reduced pressure, the forerun was discarded and the hydrogenated secondary amine was obtained in a yield of 11 parts as a water-white liquid boiling at about 140° C./8 mm. The residue in the distillation flask was of negligible quantity.

Since certain changes may be made in carrying out the above method without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention, which as a matter of language might be said to fall therebetween.

Having described my invention, what I claim as new and desire to secure by Letters Patent is:

1. In a process for the production of a Schiff's base by reacting a non-olefinic ketone which contains at least five carbon atoms per molecule with a primary amine, the reaction between the ketone and the amine resulting in the linking by a double bond of the carbonyl carbon atom of the ketone to the nitrogen atom of the primary amine group of the primary amine compound with the splitting out of water, the improvement which comprises carrying out the reaction between the ketone and the primary amine under non-hydrogenating conditions in the presence of a surface active clay catalyst.

2. In a process for the production of a Schiff's base by reacting a non-olefinic ketone which contains at least five carbon atoms per molecule with a primary amine, the reaction between the ketone and the amine resulting in the linking by a double bond of the carbonyl carbon atom of the ketone to the nitrogen atom of the primary amine group of the primary amine compound with the splitting out of water, the improvement which comprises carrying out the reaction between the ketone and the primary amine under non-hydrogenating conditions in the presence of an activated hydrosilicate catalyst.

3. The method of claim 2 in which the ketone is methyl isobutyl ketone.

4. The method of claim 2 in which the ketone is methyl amyl ketone.

5. The method of claim 2 in which the ketone is methyl hexyl ketone.

6. The method of claim 2 in which the primary amine is a polyamine.

7. The method of claim 2 in which the primary amine is an alkylolamine.

8. The method of claim 2 in which the primary amine is aniline.

9. The method of claim 2 in which the primary amine is diethylene triamine.

BERNARD A. DOMBROW.

REFERENCES CITED

The following references are of record in the file of this patent:

UNITED STATES PATENTS

| Number | Name | Date |
|---|---|---|
| 2,002,642 | Meuser et al. | May 28, 1935 |
| 2,045,574 | Adkins et al. | June 30, 1936 |
| 2,113,241 | Punnett | Apr. 5, 1938 |
| 2,115,884 | Schollkopf | May 3, 1938 |
| 2,174,762 | Scheutte et al. | Oct. 3, 1939 |
| 2,265,051 | Adams | Dec. 2, 1941 |
| 2,381,526 | Throdahl | Aug. 7, 1945 |

FOREIGN PATENTS

| Number | Country | Date |
|---|---|---|
| 365,214 | Great Britain | Jan. 21, 1932 |

OTHER REFERENCES

Degering: "An Outline of Organic Nitrogen Compounds" (1945), p. 203.